United States Patent
Yun et al.

(10) Patent No.: US 8,984,546 B2
(45) Date of Patent: Mar. 17, 2015

(54) WIRE HOLDER AND WIRING LAYERS INCLUDED IN AN OBJECTIVE LENS DRIVING UNIT

(71) Applicant: Toshiba Samsung Storage Technology Korea Corporation, Suwon-si (KR)

(72) Inventors: Jae-kuon Yun, Suwon-si (KR); Chan-ik Lee, Suwon-si (KR); Won-seok Choi, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/916,709

(22) Filed: Jun. 13, 2013

(65) Prior Publication Data

US 2013/0339987 A1 Dec. 19, 2013

(30) Foreign Application Priority Data

Jun. 13, 2012 (KR) ........................ 10-2012-0063406

(51) Int. Cl.
| | | |
|---|---|---|
| *G11B 7/09* | (2006.01) | |
| *G02B 7/02* | (2006.01) | |
| *G11B 7/08* | (2006.01) | |
| *G11B 7/085* | (2006.01) | |

(52) U.S. Cl.
CPC ............... *G02B 7/02* (2013.01); *G11B 7/0933* (2013.01); *G11B 7/0932* (2013.01)
USPC .......................................... 720/685; 720/681

(58) Field of Classification Search
CPC ... G11B 7/0935; G11B 7/0933; G11B 7/0932

USPC ......... 369/44.14, 44.15, 44.22; 720/683, 685, 720/681

See application file for complete search history.

(56) References Cited

U.S. PATENT DOCUMENTS

| | | | |
|---|---|---|---|
| 6,844,626 B2 | 1/2005 | Lai et al. | |
| 2003/0123374 A1* | 7/2003 | Matsumura et al. | 369/215 |
| 2005/0030842 A1* | 2/2005 | Cho et al. | 369/44.15 |
| 2007/0187842 A1* | 8/2007 | Shin et al. | 257/786 |
| 2008/0119091 A1* | 5/2008 | Nishide | 439/733.1 |
| 2012/0281517 A1* | 11/2012 | Lee et al. | 369/112.23 |

FOREIGN PATENT DOCUMENTS

| | | | |
|---|---|---|---|
| JP | 07153097 A | * | 6/1995 |
| JP | 2000-277659 | | 10/2000 |
| KR | 20-0135910 | | 4/1999 |
| KR | 2001-0042057 | | 5/2001 |
| KR | 2009022118 A | * | 3/2009 |
| KR | 10-0907576 | | 7/2009 |
| KR | 10-2011-0123456 | | 11/2011 |
| WO | WO 99/52102 | | 10/1999 |

OTHER PUBLICATIONS

English-machine translation of KR 2009-022118 A to Kim et al., published Mar. 2009.*
English-machine translation of KR 1997-045987 U to Lee, published Jul. 1997.*

* cited by examiner

*Primary Examiner* — Will J Klimowicz
(74) *Attorney, Agent, or Firm* — NSIP Law (57) ABSTRACT

Provided is an objective lens driving unit that prevents an electrical short circuit between very closely spaced second terminals in the objective lens driving unit. The objective lens driving unit is capable of being used in a slim-type optical disc drive.

18 Claims, 5 Drawing Sheets

WIRE HOLDER AND WIRING LAYERS INCLUDED IN AN OBJECTIVE LENS DRIVING UNIT

CROSS-REFERENCE TO RELATED APPLICATION(S)

This application claims the benefit under 35 USC §119(a) of Korean Patent Application No. 10-2012-0063406, filed on Jun. 13, 2012, in the Korean Intellectual Property Office, the entire disclosure of which is incorporated herein by reference for all purposes.

BACKGROUND

1. Field

The following description relates to an objective lens driving unit that prevents a short circuit between terminals thereof.

2. Description of Related Art

An objective lens driving unit in an optical pickup device typically has a structure of a voice coil motor (VCM) and includes a static structure and a moving structure. The static structure typically includes a permanent magnet, a yoke, and a wire holder. The moving structure typically includes a drive coil, an objective lens, and a frame for supporting the drive coil and objective lens. In general, the moving structure is supported by a plurality of suspension wires with respect to the static structure. The wire holder has a plurality of terminals for connecting with an external circuit and is typically affixed to the yoke by a screw. The suspension wires provide an electrical connection component to the drive coil to apply a driving voltage to control focusing and tracking of the objective lens. The suspension wires are fixed to the wire holder for electrical connection to the terminals.

Because the terminals are arranged on one side of the wire holder at very closely spaced intervals, a short circuit may occur due to a conductive solder material when connecting wires for an electrical connection with an external circuit. This short-circuit may only be detected by electrical testing. Thus, a careful soldering process and inspection of solder joints are required in order to prevent the occurrence of a short-circuit. These requirements increase maintenance costs during the manufacturing process.

SUMMARY

In an aspect, there is provided an objective lens driving unit including a moving structure including an objective lens and a plurality of drive coils, a static structure including magnets corresponding to the plurality of drive coils, a yoke for supporting the magnets, and a wire holder including a plurality of control wiring layers connected to the plurality of drive coils, each of the plurality of wiring layer comprising first and second terminals at respective ends thereof, a plurality of suspension wires that connect the plurality of drive coils to the plurality of wiring layers, and isolation ribs disposed between the first terminals and/or between the second terminals of the plurality of control wiring layers to prevent a conductive material formed in each terminal from intruding into another terminal adjacent thereto.

The isolation ribs may be formed integrally with the wire holder.

An end of each suspension wire may be fixed to a respective second terminal, and the isolation ribs may be disposed between the second terminals.

The plurality of control wiring layers may be fixedly buried directly in the wire holder.

The yoke may include a supporting portion fixed to the wire holder, and the supporting portion is fixedly buried in the wire holder.

The wire holder may further comprise a ground wiring layer disposed in the wire holder to connect the yoke to an external circuit, the ground wiring layer comprising first and second terminals at respective ends thereof, and the second terminal of the ground wiring layer may be directly connected to a projection formed in the supporting portion by the conductive material.

The ground wiring layer may be located at a center of a side of the wire holder, and the plurality of control wiring layers may be arranged on respective sides of the ground wiring layer.

The isolation ribs may be formed integrally with the wire holder by injection molding.

The objective lens driving unit may further comprise reinforcing ribs disposed on a rear surface of the wire holder to firmly secure the plurality of control wiring layers to a main body of the wire holder.

In an aspect, there is provided an optical pickup device including an objective lens driving unit, and a base that supports the objective lens driving unit and that comprises a light source and a light-receiving device therein, wherein the objective lens driving unit comprises a moving structure including an objective lens and a plurality of drive coils, a static structure including magnets corresponding to the plurality of drive coils, a yoke for supporting the magnets, and a wire holder including a plurality of control wiring layers connected to the plurality of drive coils, each of the plurality of wiring layer comprising first and second terminals at respective ends thereof, a plurality of suspension wires that connect the plurality of drive coils to the plurality of wiring layers, and isolation ribs disposed between the first terminals and/or between the second terminals of the plurality of control wiring layers to prevent a conductive material formed in each terminal from intruding into another terminal adjacent thereto.

The isolation ribs may be formed integrally with the wire holder.

An end of each suspension wire may be fixed to a respective second terminal, and the isolation ribs may be disposed between the second terminals.

The plurality of control wiring layers may be fixedly buried directly in the wire holder.

The yoke may include a supporting portion fixed to the wire holder, and the supporting portion may be fixedly buried in the wire holder.

In an aspect, there is provided an objective lens driving unit including a moving member comprising an objective lens and a plurality of drive coils for driving the objective lens, and a static member comprising a wire holder including a plurality of control wiring layers connected to the plurality of drive coils, each of the plurality of wiring layer comprising first and second terminals at respective ends thereof, wherein isolation ribs are disposed between the first terminals and/or the second terminals of the plurality of control wiring layers.

The objective lens driving unit may further comprise a plurality of suspension wires that electrically connect the plurality of drive coils to the plurality of wiring layers.

The plurality of control wiring layers may be fixedly buried directly in the wire holder.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
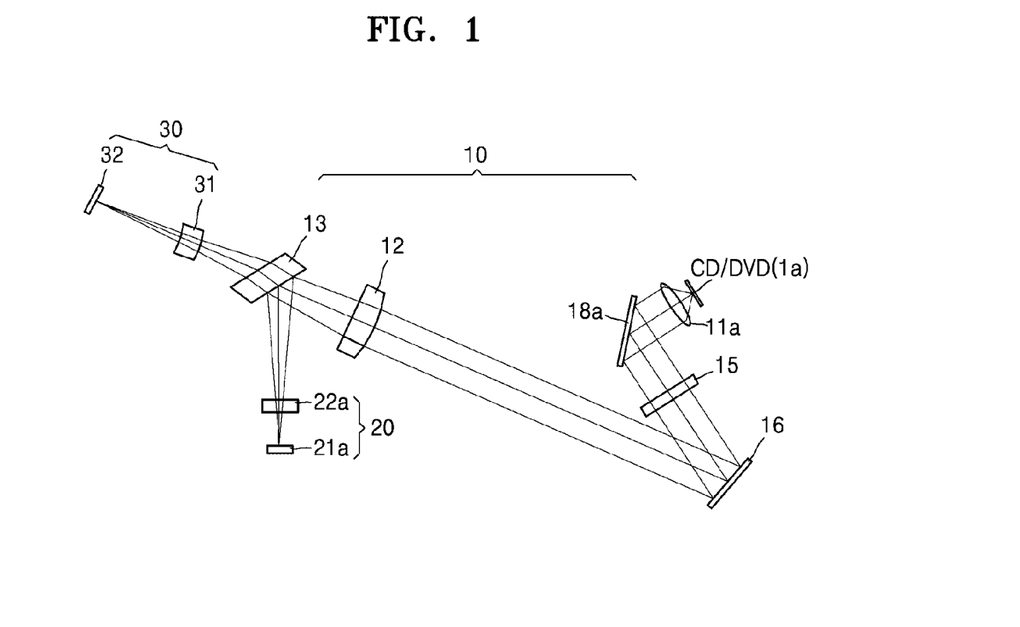
FIG. 1 is a diagram illustrating an example of an optical pickup device.

FIG. 1 illustrates an example of an optical pickup device for compact disc (CD)/digital versatile disc (DVD).

Referring to FIG. 1, the optical pickup device includes a light transmission system 10 corresponding to a first medium 1a, i.e., a CD or DVD, a light source system 20 that provides a plurality of beams for reproducing information from and/or recording information on the first medium 1a, and a light reception system 30 that generates an electrical signal for processing a data signal or a tracking error signal (TES) by using a light-receiving device 32. For example, the light source system 20 may generate three beams including a central main beam and first and second sub-beams on both sides of the central main beam. The light-receiving device 32 may have three light-receiving cells or more for receiving three beams reflected by the first medium 1a for reproducing information.

The light source system 20 includes a light source 21a for CD/DVD and a grating element 22a. A beam from the light source 21a passes through the grating element 22a and is incident on a first beam splitter 13. The grating element 22a may be used to diffract a single beam from the light source 21a into a main beam and positive and negative first-order sub-beams.

The light reception system 30 includes the light-receiving device 32 that detects the three beams reflected by the first medium 1a and passing through the first beam splitter 13 and generates an electrical signal based on the detected beams. The light reception system 30 also includes a sensing lens 31 that focuses the main beam and the first and second sub-beams with an appropriate size for the light-receiving device 32.

The light transmission system 10 includes an objective lens 11a corresponding to the first medium 1a, a path changing mirror 16, a quarter wave plate (QWP) 15, a collimating lens 12, and the first beam splitter 13. The first beam splitter 13 may be used to reflect the three beams from the light source system 20 toward the objective lens 11a and to transmit light reflected by the first medium 1a to the light reception system 30.

Figure 2:
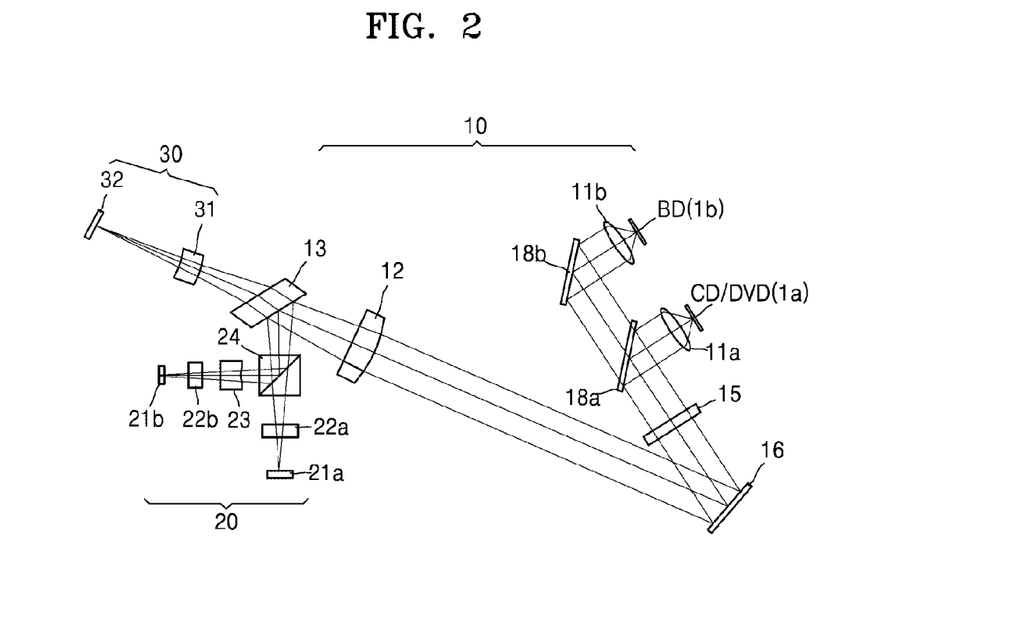
FIG. 2 is a diagram illustrating another example of an optical pickup device.

FIG. 2 illustrates another example of an optical pickup device that is compatible with CDs, DVDs, and Blu-ray discs (BDs).

Referring to FIG. 2, the optical pickup device includes a light transmission system 10, a light source system 20, and a light reception system 30. In this example, the light transmission system 10 includes a total reflection mirror 18b disposed below an objective lens 11b corresponding to a BD and a dichroic mirror 18a disposed below an objective lens 11a corresponding to a CD/DVD. Here, the dichroic mirror 18a enables blue light to pass through. The total reflection mirror 18b and the dichroic mirror 18a are optional elements and are disposed in an optical propagation path from an optical path changing mirror 16. The optical path changing mirror 16 reflects light from the first beam splitter 13 toward the dichroic mirror 18a, and reflects light from the first and second media 1a and 1b toward the first beam splitter 13.

In this example, the light source system 20 includes a plurality of light sources corresponding to the first and second media 1a and 1b. The plurality of light sources may be, for example, a light source 21a for CD/DVD, and a light source 21b for BD. Each of the light sources 21a and 21b may emit light toward a second beam splitter 24 that has a cubic structure. A coupling lens 23 is disposed between the light source 21b for BD and the second beam splitter 24 to adjust an optical distance between the light source 21b for BD and the second medium 1b by controlling an optical magnification, i.e., the amount of defocus in propagating light.

Light emitted by the light sources 21a and 21b passes through the second beam splitter 24 to the first beam splitter 13. A grating element 22a for a CD/DVD and a grating element 22b for a BD which are used to create a main beam and positive and negative first-order sub-beams are disposed between the second beam splitter 24 and the light source 21a and between the second beam splitter 24 and the light source 21b, respectively. An interval between the main beam and the positive and negative first-order sub-beams may vary according to an interval between gratings of the grating element 22a or 22b.

The optical pickup devices having the above-described configurations may be assembled into one structure. The structure may be included in a device such as a game console, a CD/DVD player, a Blu-ray player, a digital television system, a set-top box, and the like. For example, the optical pickup device of FIG. 1 may be included in an assembly having a construction as illustrated in FIG. 3.

Figure 3:
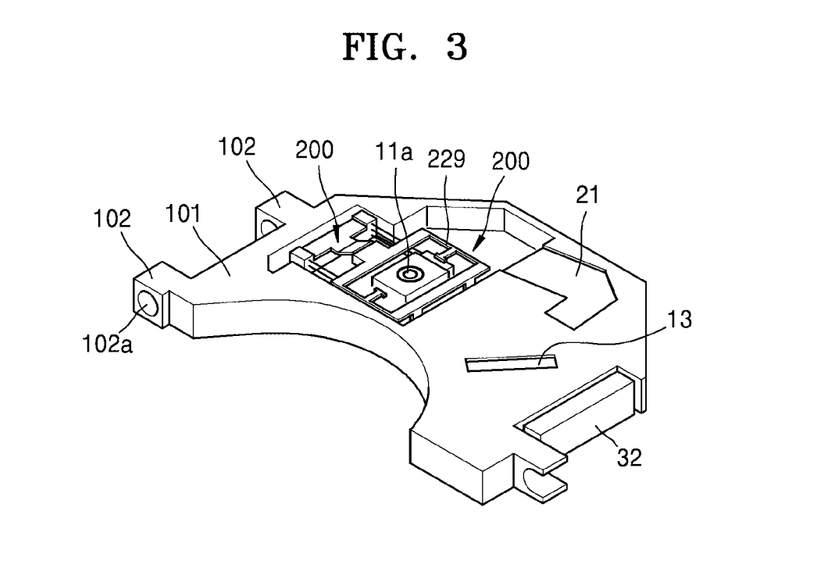
FIG. 3 is a diagram illustrating an example of an optical pickup device having the construction shown in FIG. 1.

Referring to FIG. 3, an assembly base 101 having a predetermined thickness includes a space for accommodating a plurality of optical components. For example, the assembly base 101 may be formed by aluminum die casting or plastic molding.

In this example, the assembly base 101 includes an objective lens driving unit 200 that has an objective lens 11*a* and a protective cover 229 that surrounds the periphery of the objective lens 11*a*. Optical components such as the first beam splitter 13, the light source 21*a*, and the light-receiving device 32 are fixedly inserted into the assembly base 101 and arranged as shown in FIG. 1. A shaft guide portion 102 is disposed at one side of the assembly base 101 and has cylindrical holes 102*a* into which a guide shaft (not shown) of an optical disc drive device (not shown) may be inserted.

Figure 4:
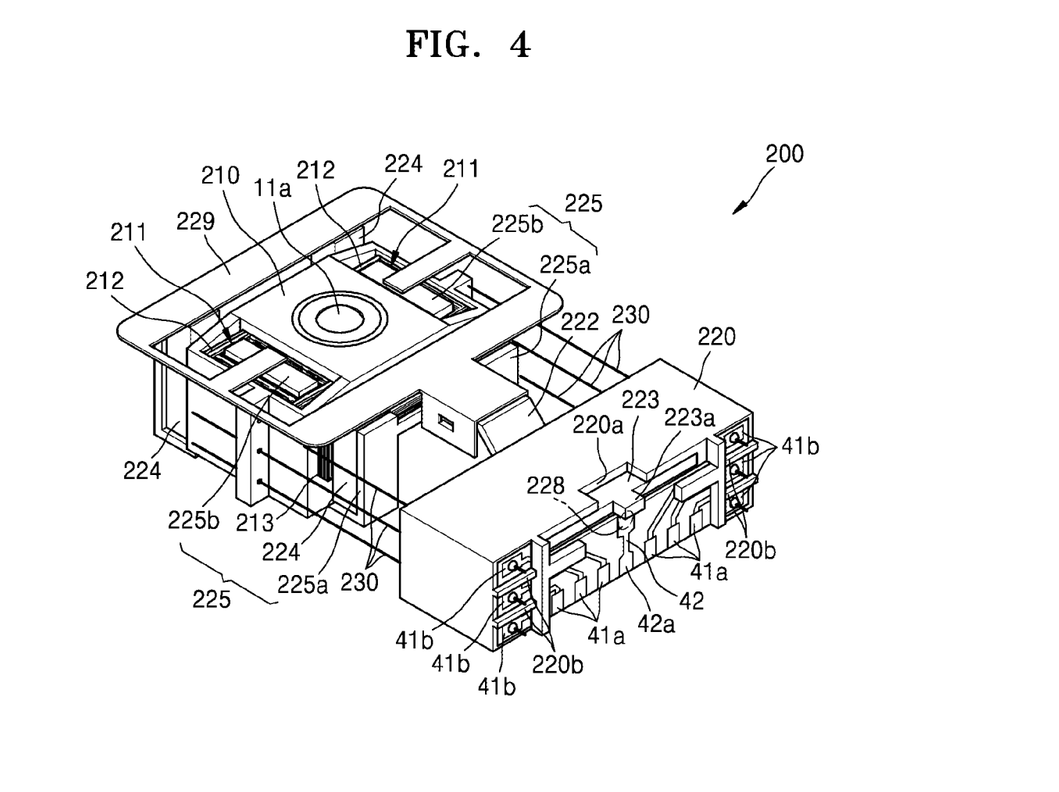
FIG. 4 is a diagram illustrating an example of an objective lens driving unit.

FIG. 4 illustrates an example of the objective lens driving unit 200 used in the optical pickup device illustrated in FIGS. 1 through 3. Referring to FIG. 4, the objective lens 11*a* is disposed at a center of a top surface of a frame 210 of a moving structure having a quadrangular frame shape, and is surrounded by the protective cover 229. A first drive coil 212 that is used to focus the objective lens 11*a* is embedded in an inner surface of each of quadrangular through-holes 211 formed at both sides of the frame 210. A second drive coil 213 that is used for a tracking operation is attached to an outer surface of the through-hole 211.

In the objective lens driving unit 200, a static structure includes a permanent magnet 224, a yoke structure 225, and a wire holder 220. Here, the yoke structure 225 includes a peripheral yoke 225*a* having a column shape facing the second drive coil 213 and a central yoke 225*b* disposed at a center of the through-hole 211. The permanent magnet 224 is fixed to an inner surface of the peripheral yoke 225*a* such that it faces the second drive coil 213.

Furthermore, a supporting portion 223 and a connection part 222 are formed at a side of the yoke structure 225. The supporting portion 223 is fixedly buried in a top surface (or a second surface) of the wire holder 220. Further, the connection part 222 is disposed between the yoke structure 225 and the supporting portion 223.

One end of the protective cover 229 is coupled to the connection part 222, such that the protective cover 229 and the yoke structure 225 are electrically connected to each other and grounded out through a ground wiring layer (42 in FIG. 5) as further described below.

The wire holder 220, the yoke structure 225, and the permanent magnet 224 are assembled together in the static structure. In this example, the static structure elastically supports the frame 210 of the moving structure through a plurality of suspension wires 230.

Figure 5:
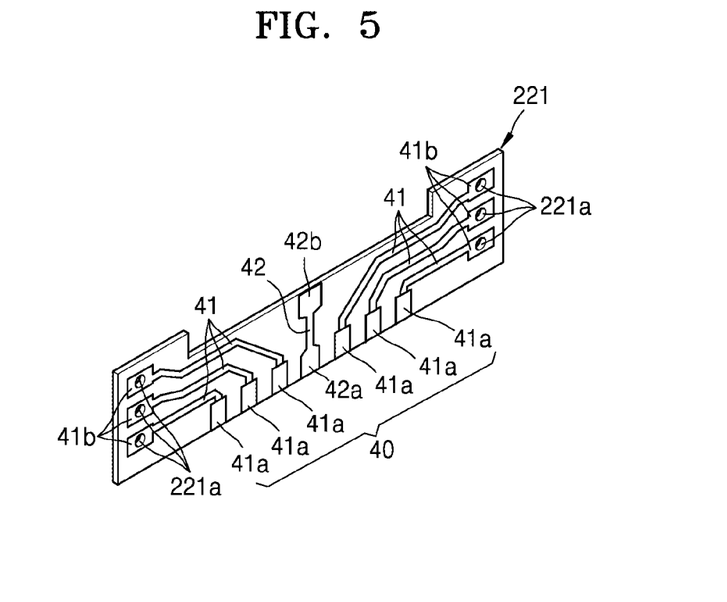
FIG. 5 is a diagram illustrating an example of a circuit board used in an objective lens driving unit.

FIG. 5 illustrates an example of a circuit board 221 including a plurality of penetration holes 221*a* for fixing the plurality of suspension wires 230. Referring to FIG. 5, the circuit board 221 includes a plurality of wiring layers 41 and 42 that are fixed to a rear surface (or first surface) of the wire holder 220. In this example, a ground wiring layer 42 is located at a center of the circuit board 221 while a plurality of control wiring layers 41 are arranged and dispersed on both sides of the ground wiring layer 42. The ground wiring layer 42 connects the yoke structure 225 to a ground of an external circuit, and the control wiring layers 41 are connected to the first and second drive coils 212 and 213 through the suspension wires 230.

In this example, the ground wiring layer 42 includes first and second terminals 42*a* and 42*b*, and each of the control wiring layers 41 includes first and second terminals 41*a* and 41*b*. The first terminals 41*a* and 42*a* of the control and ground wiring layers 41 and 42 are connected to an external circuit. Further, the second terminal 41*b* of the control wiring layer 41 is connected to an end of the suspension wire 230, and the second terminal 42*b* of the ground wiring layer 42 is electrically connected to a projection 223*a* by a conductive material 229 such as solder. The projection 223*a* projects out from an end of the supporting portion 223 and is exposed through an opening 220*a* of the wire holder 220.

Figure 6:
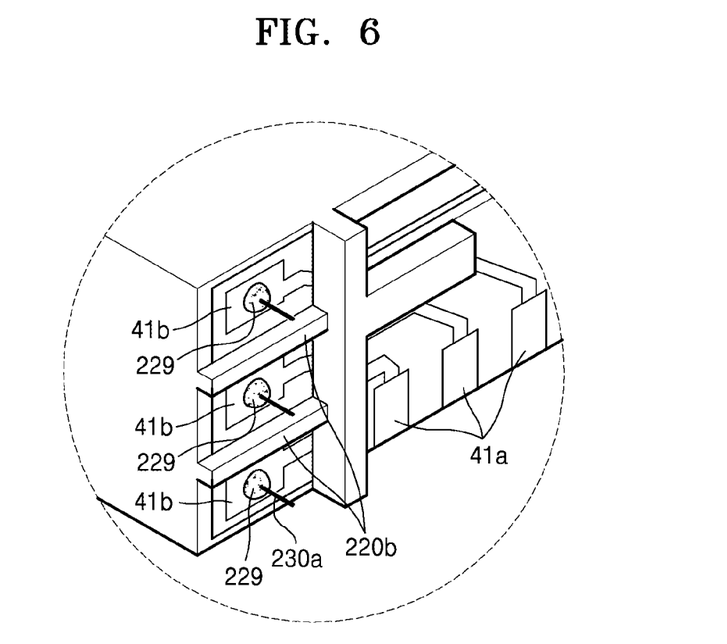
FIG. 6 is a diagram of a wire holder illustrating an example of a connection portion between an end of a suspension wire and a second terminal of a wiring layer.
Figure 7:
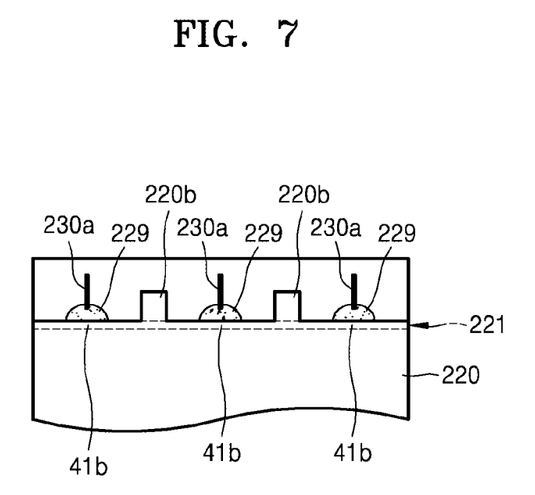
FIG. 7 is a diagram illustrating an example of a separation of solder materials from each other by partition ribs at a connection portion between an end of a suspension wire and a second terminal of a wiring layer in an objective lens driving unit.

As shown in FIGS. 4 and 5, the terminals 41*a*, 41*b*, 42*a*, and 42*b* of the plurality of wiring layers 41 and 42 are closely arranged. In this case, when an end (230*a* in FIG. 6) of the suspension wire 230 is joined to the second terminal 41*b* by solder, the solder may short out an adjacent second terminal 41*b*. To prevent this short-circuit from occurring, as shown in FIGS. 4, 6, and 7, isolation ribs 220*b* are disposed between the second terminals 41*b*. The isolation ribs 220*b* may prevent a conductive material 228*a* such as solder for bonding the end 230*a* of the suspension wire 230 to the second terminal 41*b* from flowing into the adjacent second terminal 41*b*. Although the isolation ribs 220*b* may be integrated into the circuit board 221, as another example, they may be formed integrally with the wire holder 220.

In some examples, the circuit board 221 including the plurality of control wiring layers 41 may be fixed to the wire holder 220 while manufacturing the wire holder 220 by using injection molding. For example, during injection molding, the circuit board 221 may be embedded in given positions of a mold as an insert. Because the injection mold has a molding shape engraved therein corresponding to the isolation ribs 220*b*, the isolation ribs 220*b* may be formed on the circuit board 221 while injection molding the wire holder 220. As another example, the isolation ribs 220*b* may be disposed between the first terminals 41*a* connected to the external circuit.

Figure 8:
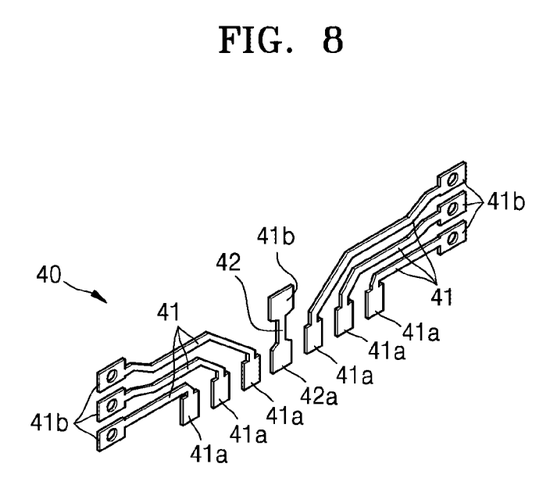
FIG. 8 is a diagram illustrating an example of wiring layers that are buried in a wire holder and used in an objective lens driving unit.

The control wiring layers 41 may be fixedly buried in the wire holder 220 without the circuit board 221. FIG. 8 illustrates an example of the control wiring layers 41 directly fixed (buried) to the wire holder 220. To fixedly bury the control wiring layers 41 in the wire holder 220, the control wiring layers 41 may be placed as inserts during injection molding of the wire holder 220. The control wiring layers 41 may be provided as a lead-frame during manufacturing of the wire holder 220, and an unnecessary part of the lead-frame may be removed upon completion of the wire holder 220.

Figure 9:
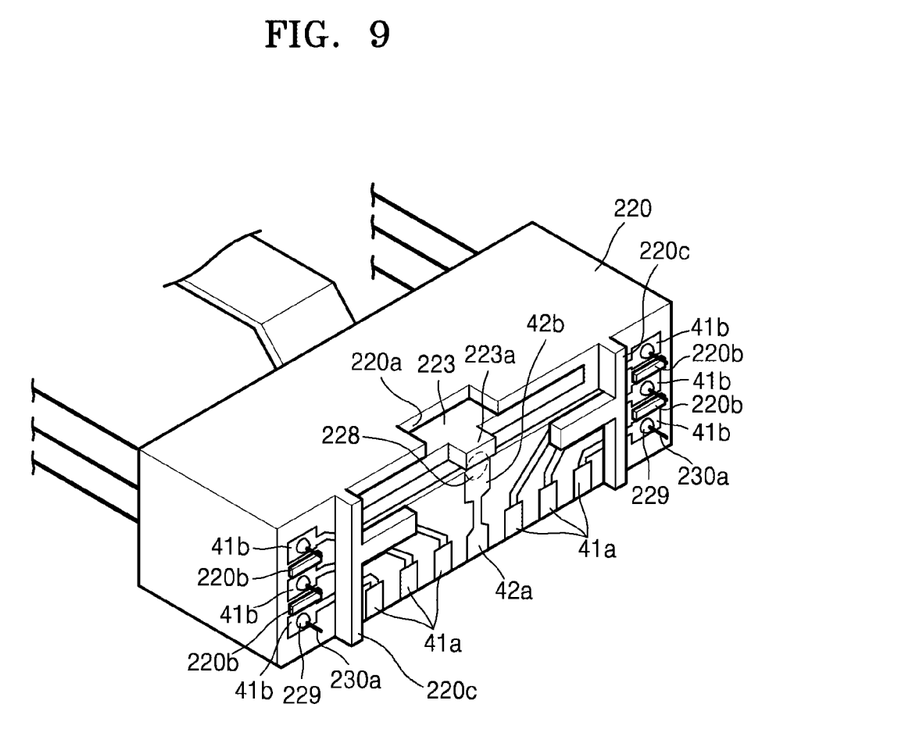
FIG. 9 is a diagram illustrating an example of a wire holder including the wiring layers shown in FIG. 8.

FIG. 9 illustrates an example of the wire holder 220 including the control wiring layers 41 shown in FIG. 8 in an objective lens driving unit.

Referring to FIG. 9, the control wiring layers 41 are fixedly buried in the rear surface of the wire holder 220. For example, the objective lens driving unit may further include reinforcing ribs 220*c* disposed on the rear surface of the wire holder 220 so as to more firmly secure the control wiring layers 41 to a main body of the wire holder 220. Here, the reinforcing ribs 220*c* may prevent the control wiring layers 41 from escaping or coming off from the wire holder 220. The supporting portion 223 connected to the yoke structure 225 through the connection portion 222 is fixedly buried in the top surface of the wire holder 220. Furthermore, a projection 223*a* of the supporting portion 223 is disposed adjacent to the second terminal 42*b* of the ground wiring layer 42 through the opening 220*a* formed at a side of the top surface of the wire holder 220. The projection 223*a* and the second terminal 42*b* are electrically coupled to each other by the conductive material 228 such as solder.

According to various aspects, the isolation ribs 220*b* are disposed between the second terminals 41*b* of the control wiring layers 41 and allow the conductive solder material 228 for connecting the end 230*a* of the suspension wire 230 to remain in the terminal 228*b* and prevent the conductive solder material from flowing out into another second terminal 41b. The second terminals 41b to which the ends 230a of the suspension wires 230 are coupled are arranged at very closely spaced intervals. This closeness is beneficial in that the objective lens driving unit may be used in a slim optical pickup device.

As the size of an optical pickup device decreases, a height of the wire holder 220 decreases, and thus an interval between the second terminals 41b of the control wiring layers 41 decreases. This decrease in the interval between the second terminals 41b may significantly increase the risk of a short circuit occurring between the adjacent terminals 41b due to the conductive solder material 228. According to various aspects, the isolation ribs 220b may be formed by making a surface of the wire holder 220 between the second terminals 41b higher than a surface of the second terminal 41b and preventing the conductive solder material 228a from intruding into the adjacent second terminal 41b.

According to various aspects, the ground wiring layer 42 is directly coupled to the supporting portion 223 integrally formed with the yoke structure 225 by soldering. The ground wiring layer 42 may be embedded in the circuit board 221 and attached to the wire holder 220. As another example, the ground wiring layer 42 itself may be fixedly buried in the wire holder 220.

Although the isolation ribs 220b are disposed between the second terminals 41b of the control wiring layers 41, the isolation ribs 220b may be provided between the first terminals 41a thereof as described above. Accordingly, the isolation ribs 220b may be disposed between the first terminals 41a and/or between the second terminals 41b.

According to various aspects, an electrical short circuit between very closely spaced second terminals in an objective lens driving unit may be prevented, thereby achieving a slimmer wire holder. Furthermore, the yoke structure may be combined integrally with the wire holder by a supporting portion fixedly buried in the wire holder, thereby eliminating the need for a separate engaging member as in a conventional structure. Furthermore, wiring layers are directly fixedly buried in the wire holder without using a circuit board, thereby eliminating the need for processes of forming wiring layers on the circuit board, cutting the circuit board, and combining the circuit board with the wire holder. Thus, the manufacturing cost may be reduced.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An objective lens driving unit comprising:
   a moving structure including an objective lens and drive coils;
   a static structure including magnets opposing the drive coils, a yoke configured to support the magnets, and a wire holder including control wiring layers connected to the drive coils, each of the wiring layers comprising first and second terminals at respective ends thereof;
   suspension wires connecting the drive coils to the wiring layers;
   isolation ribs disposed between the first terminals and/or between the second terminals of the control wiring layers and configured to prevent a conductive material formed in each terminal from intruding into another terminal adjacent thereto, wherein the isolation ribs are disposed entirely parallel to a top surface and a bottom surface of the wire holder; and
   reinforcing ribs disposed on a rear surface of the wire holder configured to firmly secure the control wiring layers to a main body of the wire holder and comprising a surface extending outward from a rear surface of the wire holder.

2. The objective lens driving unit of claim 1, wherein the isolation ribs are formed integrally with the wire holder.

3. The objective lens driving unit of claim 1, wherein an end of each suspension wire is fixed to a respective second terminal, and the isolation ribs are disposed between the second terminals.

4. The objective lens driving unit of claim 1, wherein the control wiring layers are fixedly buried directly in the wire holder.

5. The objective lens driving unit of claim 1, wherein the yoke includes a supporting portion fixed to the wire holder, and the supporting portion is fixedly buried between outer surfaces of the wire holder.

6. The objective lens driving unit of claim 5, wherein the wire holder further comprises a ground wiring layer disposed in the wire holder and configured to connect the yoke to an external circuit, the ground wiring layer comprising first and second terminals at respective ends thereof, and
   the second terminal of the ground wiring layer is directly connected to a projection formed in the supporting portion by the conductive material.

7. The objective lens driving unit of claim 6, wherein the ground wiring layer is located at a center of a side of the wire holder, and the control wiring layers are arranged on respective sides of the ground wiring layer.

8. The objective lens driving unit of claim 1, wherein the isolation ribs are formed integrally with the wire holder by injection molding.

9. The objective lens driving unit of claim 1, wherein the isolation ribs are disposed between the first terminals that are directly connected to an external circuit and disposed directly adjacent to a bottom surface of the wire holder.

10. The objective lens driving unit of claim 1, wherein a surface of the isolation ribs is coplanar with a side surface of the wire holder, the side surface of the wire holder being disposed orthogonal to the second terminal.

11. The objective lens driving unit of claim 1, wherein a surface of the isolation ribs parallel to and protruding beyond the respective second terminals is disposed orthogonal to the suspension wires.

12. The objective lens driving unit of claim 1, wherein the reinforcing ribs comprise a surface parallel to the isolation ribs and the second terminal and a second surface orthogonal to the isolation ribs and the second terminal.

13. The objective lens driving unit of claim 12, wherein the second surface of the reinforcing ribs is directly connected to the isolation ribs without a gap between the reinforcing ribs and the isolation ribs.

14. An optical pickup device comprising:
   an objective lens driving unit; and
   a base supporting the objective lens driving unit and comprising a light source and a light-receiving device therein, wherein the objective lens driving unit comprises:
      a moving structure including an objective lens and drive coils;
      a static structure including magnets opposing the drive coils, a yoke configured to support the magnets, and a wire holder including control wiring layers connected to the drive coils, each of the wiring layers comprising first and second terminals at respective ends thereof, wherein the control wiring layers are fixedly buried directly in the wire holder;

suspension wires connecting the drive coils to the wiring layers;

isolation ribs disposed between the first terminals and/or between the second terminals of the control wiring layers and configured to prevent a conductive material formed in each terminal from intruding into another terminal adjacent thereto, wherein the isolation ribs are disposed entirely parallel to a top surface and a bottom surface of the wire holder and formed integrally with the wire holder.

15. The optical pickup device of claim 14, wherein an end of each suspension wire is fixed to a respective second terminal, and the isolation ribs are disposed between the second terminals.

16. The optical pickup device of claim 14, wherein the yoke includes a supporting portion fixed to the wire holder, and the supporting portion is fixedly buried between outer surfaces of the wire holder.

17. An objective lens driving unit comprising:

a moving member comprising an objective lens and drive coils configured to drive the objective lens;

a static member comprising a wire holder including control wiring layers connected to the drive coils, each of the wiring layers comprising first and second terminals at respective ends thereof, wherein the control wiring layers are fixedly buried directly in the wire holder, and wherein isolation ribs are disposed between the first terminals and/or the second terminals of the control wiring layers, wherein the isolation ribs are disposed entirely parallel to a top surface and a bottom surface of the wire holder.

18. The objective lens driving unit of claim 17, further comprising suspension wires that electrically connect the drive coils to the wiring layers.

\* \* \* \* \*